United States Patent
Lohf et al.

(10) Patent No.: US 8,216,525 B2
(45) Date of Patent: Jul. 10, 2012

(54) MODULAR MICROFLUIDIC SYSTEM

(75) Inventors: Astrid Lohf, Erlangen (DE); Reinhold Schneeberger, Seukendorf (DE); Robert Sendner, Fürth (DE)

(73) Assignee: Siemens Aktiengesellschaft, München (DE)

(*) Notice: Subject to any disclaimer, the term of this patent is extended or adjusted under 35 U.S.C. 154(b) by 632 days.

(21) Appl. No.: 11/992,534

(22) PCT Filed: Sep. 26, 2006

(86) PCT No.: PCT/EP2006/066725
§ 371 (c)(1),
(2), (4) Date: Aug. 17, 2009

(87) PCT Pub. No.: WO2007/036513
PCT Pub. Date: Apr. 5, 2007

(65) Prior Publication Data
US 2010/0021345 A1    Jan. 28, 2010

(30) Foreign Application Priority Data

Sep. 27, 2005 (DE) .......................... 10 2005 045 811

(51) Int. Cl.
*G01N 1/38* (2006.01)
(52) U.S. Cl. .......... 422/502; 422/62; 422/501; 422/503; 422/504; 422/509; 422/565
(58) Field of Classification Search .......... 422/501–504, 422/509
See application file for complete search history.

(56) References Cited

U.S. PATENT DOCUMENTS
2002/0124896 A1 * 9/2002 O'Connor et al. ............ 137/833

FOREIGN PATENT DOCUMENTS

| | | |
|---|---|---|
| DE | 19954855 C1 | 4/2001 |
| DE | 20201753 U1 | 4/2002 |
| DE | 10 2004 022 423 A1 | 12/2005 |
| EP | 0952359 A1 | 10/1999 |
| EP | 1203954 A2 | 5/2002 |
| GB | 2421202 A | 6/2006 |
| WO | WO 01 36085 A1 | 5/2001 |
| WO | WO 01 73823 A2 | 10/2001 |
| WO | WO 02065221 A2 | 8/2002 |
| WO | WO 2005107937 A1 | 11/2005 |

* cited by examiner

*Primary Examiner* — In Suk Bullock
*Assistant Examiner* — Paul Hyun (57) ABSTRACT

A modular microfluidic system includes modules which are arranged next to each other in a row. Every module has a microfluidic part which rests on a contact surface of the module in a locally limited area and is forced against the contact surface by a fastening element. The microfluidic part includes a fluid channel system with fluid connections that are arranged on the top surface of the microfluidic part in edge areas relative to the adjoining microfluidic parts. The fluid connections of adjoining microfluidic parts are interlinked by respective connecting channels in a connecting part bridging the microfluidic parts, wherein the connecting part rests on the microfluidic parts in the edge areas. A clamping part rests against the lower surfaces of the adjoining microfluidic parts and is connected to the connecting part via an additional fastening element in the area between the microfluidic parts.

19 Claims, 7 Drawing Sheets

MODULAR MICROFLUIDIC SYSTEM

CROSS REFERENCE TO RELATED APPLICATIONS

This application is the US National Stage of International Application No. PCT/EP2006/066725, filed Sep. 26, 2006 and claims the benefit thereof. The International Application claims the benefits of German application No. 10 2005 045 811.4 DE filed Sep. 27, 2005, both of the applications are incorporated by reference herein in their entirety.

FIELD OF INVENTION

The invention relates to a modular microfluidic system, as is known in a similar manner from WO 01/36085 A1, WO 01/73823 A2 and from WO 02/065221 A2. The known microfluidic systems consist of a plurality of modules which in each case contain a microfluidic part and an associated electrical control unit and can be mounted next to each other in a row by their rear sides on a mounting rail. The control units for the different modules are connected to one another by way of an electrical line bus and the microfluidic parts by way of a fluid bus. As WO 02/065221 A2 shows, the fluid bus can be formed as a result of the fact that the microfluidic parts of respective adjoining modules are connected to one another by way of connecting parts containing connecting channels and bridging the modules in question.

BACKGROUND OF INVENTION

A modular microfluidic system is also the subject of the older German patent application having the official reference number 10 2004 022 423.4.

With regard to modular systems, there is generally a requirement to be able to insert or remove the individual modules in a simple manner. In addition, in the case of modular fluidic systems in which for example chemical reactions are intended to take place there is a demand for a secure fluidic connection of the fluidic parts and of the connecting parts connecting them.

SUMMARY OF INVENTION

An object of the invention is therefore to make possible a simple, inexpensive and secure fixing of microfluidic parts and connecting parts with regard to a modular microfluidic system and furthermore to make possible a simple exchange of the microfluidic parts and/or entire modules.

This object is for example achieved by a modular microfluidic system having the following features:
  modules of the microfluidic system are arranged next to each other in a row,
  each module has a plate-shaped microfluidic part whose underside is supported in a locally limited area on a contact surface of the module and is forced against the latter by means of a releasable fastening element, whereby the microfluidic parts of respective adjoining modules are located next to each other in one plane,
  each microfluidic part contains a fluid channel system with fluid connections which are arranged on the upper side of the microfluidic part in the edge areas relative to the potentially adjoining microfluidic parts,
  the fluid connections of each two adjoining microfluidic parts are connected to one another by connecting channels in a connecting part which bridges the two microfluidic parts and is supported in the edge areas on their upper sides,
  in the opposite edge areas a clamping part is supported on the undersides of the two adjoining microfluidic parts, which is connected to the connecting part by way of a further releasable fastening element in the area between the two microfluidic parts and forces this against the upper sides of the two microfluidic parts.

The contact surfaces of the modules arranged next to each other together form a reference plane for the microfluidic parts which can be mounted on the modules in such a manner that the latter come to be situated in a common plane next to each other. Since the plate-shaped microfluidic parts are in each case supported only in a locally limited area, preferably in the center of the plate, on the contact surface, the upper sides and undersides of the microfluidic parts outside of these locally limited areas are available for the connection of the connecting parts and, as is explained below in further detail, for the connection of further microfluidic and/or macrofluidic units and/or fluidic add-on units. The pressure of the microfluidic part against the contact surface is exerted by means of the releasable fastening element, preferably in the form of a screw, which can be fastened in a simple manner by being screwed in from above through an opening in the microfluidic part into a screw thread in the contact surface of the module.

The connecting parts for the microfluidic parts of respective adjoining modules can be simply mounted from above onto the two microfluidic parts, whereby they are supported in the adjoining edge areas of the two microfluidic parts and connect the fluid connections there with one another by way of their connecting channels in a connection pattern predefined according to the embodiment of the connecting part. The clamping part is guided from beneath against the adjoining microfluidic parts and secured in the area between the two microfluidic parts with the further fastening element in such a manner that the connecting part is forced firmly against the upper sides of the two microfluidic parts. In this situation, the further fastening element consists preferably of a screw which can be fastened in a simple manner by being screwed in from above through an opening in the connecting part into a screw thread in the clamping part. In the area between the two microfluidic parts the clamping part preferably has a further contact surface for the connecting part, which is located at least approximately in the plane of the upper sides of the microfluidic parts in such a manner that in the mounted state the connecting part is supported on this further contact surface and cannot bend further or break under the pressure exerted by the fastening element. In the area of the fluid connections are arranged preferably elastic sealing means, such as sealing rings for example, which are forced together by the contact pressure of the connecting part and seal the fluid connections to the outside. In addition, the elastic sealing means allow to a certain extent different thickness tolerances or positional tolerances (height displacement) of the respective adjoining microfluidic parts in the vertical direction without compromising the leak-tightness of the system. In this context, it is advantageous that the connecting parts are not fastened to the modules but that they connect the respective adjoining microfluidic parts in a self-supporting manner. This also advantageously allows positional tolerances of the respective adjoining microfluidic parts in the horizontal direction.

The microfluidic system exhibits the following further advantages on the basis of its features according to the invention:

The microfluidic parts can be installed in the modules before these are placed together in a row to form the microfluidic system and the connecting parts between respective adjoining modules are mounted. If a module in the system is to be exchanged, it is therefore not even necessary to first remove the microfluidic part from the module in question. On the other hand, microfluidic parts on the modules of the microfluidic system can be exchanged without the modules needing to be removed from the microfluidic system.

The connecting parts between the respective adjoining microfluidic parts can be inserted, removed or exchanged in an extremely simple manner by loosening the further fastening element between the connecting part and the clamping part in such a manner that the connecting part together with the clamping part can be pushed into, or pushed out from, the area between the two microfluidic parts from the front or from behind.

In order to facilitate the installation of the microfluidic parts on the modules and to avoid installation errors, the microfluidic parts and modules preferably have positioning means, for example taking the form of pin/hole combinations, for aligning the microfluidic parts with respect to the modules. Correspondingly, the connecting parts and the respective adjoining microfluidic parts to be bridged by them can also have further positioning means for aligning the respective connecting part with respect to the two microfluidic parts. In this situation, the positioning means or the further positioning means are preferably arranged in accordance with a coding which allows only predefined combinations of microfluidic part and module or connecting part and microfluidic part. As already explained above, the self-supporting connection of the respective adjoining microfluidic parts allows positional tolerances of the microfluidic and connecting parts in the horizontal direction in such a manner that the positioning means can also be implemented or arranged such that they allow these tolerances.

Since, as already mentioned above, the plate-shaped microfluidic parts are in each case supported only in locally limited areas, preferably the centers of the plates, on the contact surfaces of the modules, the upper sides and undersides of the microfluidic parts outside of these locally limited areas are available for the connection of the connecting parts and further microfluidic and/or macrofluidic units and/or fluidic add-on units. Provision is therefore advantageously made whereby in at least one of the modules at least one further microfluidic and/or macrofluidic unit can be mounted beneath the microfluidic part in such a manner that further fluid connections of the at least one further microfluidic and/or macrofluidic unit outside of the locally limited area press against the underside of the microfluidic part and are thereby connected with additional fluid connections of the microfluidic part which are present there. With regard to the further microfluidic and/or macrofluidic units, these can for example be pumps, valves and measurement or analytical equipment which on account of their size or for other reasons are not integrated into the microfluidic units but in other respects are important components of the modules. The modules can therefore have doors or removable cover panels on their front sides in order to enable access to the interior of the modules and to allow mounting of the further microfluidic and/or macrofluidic units from beneath in the direction of the microfluidic parts.

Since the further microfluidic and/or macrofluidic units press against the microfluidic parts from beneath and can therefore put a one-sided stress on the latter, provision can be made whereby in the case of a one-sided arrangement of the further fluid connections of the at least one further microfluidic and/or macrofluidic unit with respect to the contact surface of the respective module the latter has an auxiliary contact surface on the opposite side at approximately the same distance from the contact surface, such that the mechanical stress on the microfluidic part becomes symmetrical as a result.

The contact surface for the microfluidic part can be implemented directly on the housing of the module. By preference, however, it is implemented on the upper side of an adapter plate which is secured so as to be exchangeable on a housing of the module and on whose underside the at least one further microfluidic and/or macrofluidic unit can be mounted. In this manner, different adapter plates for different further microfluidic and/or macrofluidic units capable of mounting on them can be provided. The adapter plates can contain openings through which the further fluid connections of the further microfluidic and/or macrofluidic units project as far as the undersides of the microfluidic parts. By preference, on the adapter plates between the microfluidic parts and the further microfluidic and/or macrofluidic units are arranged fluid connection adapters, on whose upper sides projecting as far as the underside of the microfluidic parts are implemented the further fluid connections and on whose underside the further microfluidic and/or macrofluidic units can be fluidically connected. The fluid connection adapters can be easily exchanged and make it possible to fluidically connect different further microfluidic and/or macrofluidic units to the microfluidic parts.

In order to further increase the flexibility of the modular microfluidic system for the user, individual connecting parts can have on their upper side yet further fluid connections and fastening means for the connection of fluidic add-on units. The fluidic add-on units in question can be non-return valves, manometers, heat exchanger units, optical probes for in-line analysis etc., which can be incorporated by the user into the microfluidic system at different points thereof. It is thus for example also possible to feed in further fluids such as reactants or to remove fluids at different points of the microfluidic system.

In order to allow fluids to be fed in or removed at the end modules, in other words the start and end modules, of the microfluidic system a fluid connection part for the connection of external fluid lines, which can be secured on the underside of the connecting part by means of the further releasable fastening element and thereby connects the connecting channels in the connecting part with the external fluid lines, is provided in each case for the end modules. This means that no special end modules are required because any module can be used as an end module.

In order to protect the microfluidic parts these can in each case be covered from above by a protective cover leaving the edge areas uncovered and secured in a releasable manner to the respective module, whereby the connecting parts can preferably be covered in each case by means of a further protective cover which can be inserted between the protective covers of adjoining modules. Individual modules of the microfluidic system can therefore be installed or exchanged without the protective cover over the respective microfluidic part having to be removed, in such a manner that the microfluidic part is protected when work is being carried out on the connecting parts. In order to enable the installation of the fluidic add-on units already mentioned above on the connecting parts the further protective covers above the areas provided for connection of fluidic add-on units on the connecting parts can in each case have a cover part which can be removed, for example by breaking it out.

BRIEF DESCRIPTION OF THE DRAWINGS

The invention will be described in further detail in the following with reference to the figures. In the individual drawings.

DETAILED DESCRIPTION OF INVENTION

Figure 1:
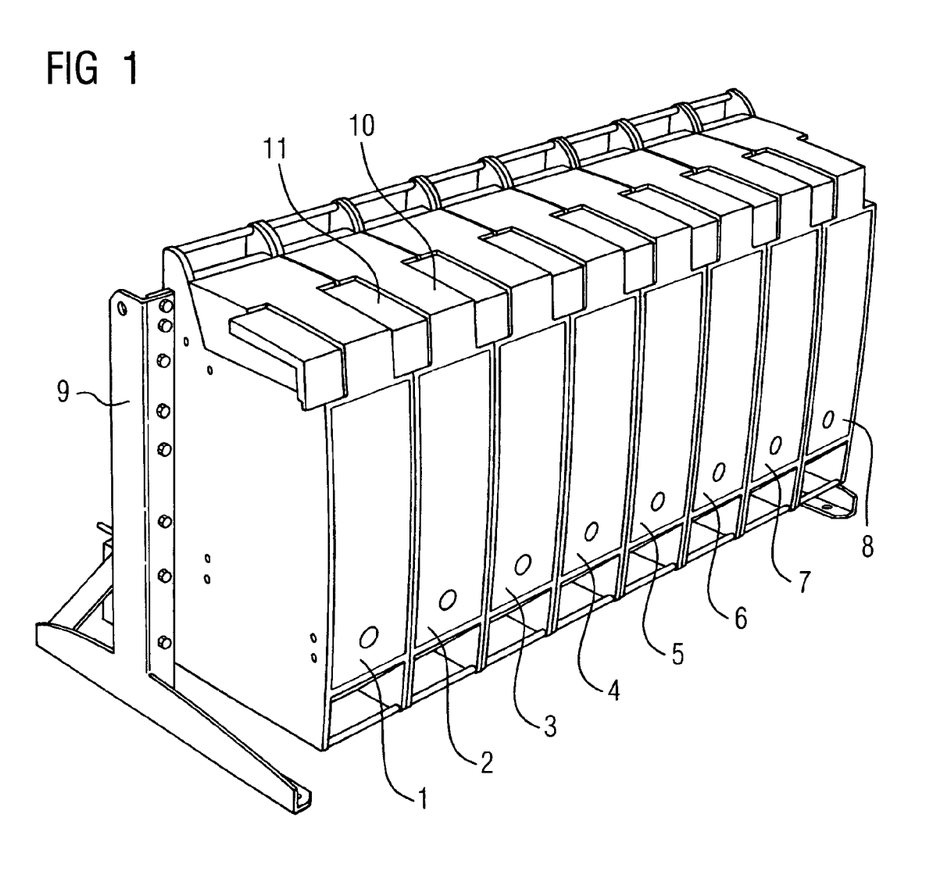
FIG. 1 shows an embodiment of the modular microfluidic system according to the invention.

FIG. 1 shows a microfluidic system with modules 1 to 8 which are arranged in a row next to each other and are held at the rear side on a carrier frame 9. In this situation, the modules 1 and 8 constitute the end modules, in other words the start and end modules, of the microfluidic system. Each module 1 to 8 contains a microfluidic part and an associated electrical control unit. The control units of the different modules are connected to one another by way of an electrical line bus and the microfluidic parts by way of a fluid bus. The electrical line bus runs in the carrier frame 9, whereby the modules 1 to 8 are connected to the line bus in a releasable manner by way of rear-side plug-in connectors. The fluid bus is formed from connecting parts containing connecting channels, which fluidically connect the microfluidic parts of respective adjoining modules 1 to 8 with one another. The microfluidic parts are arranged in the area of the module upper sides and are covered during normal operation of the microfluidic system by protective covers 10 held in a releasable manner on the modules 1 to 8. The connecting parts connecting the microfluidic parts of respective adjoining modules 1 to 8 are covered by further protective covers 11.

Figure 2:
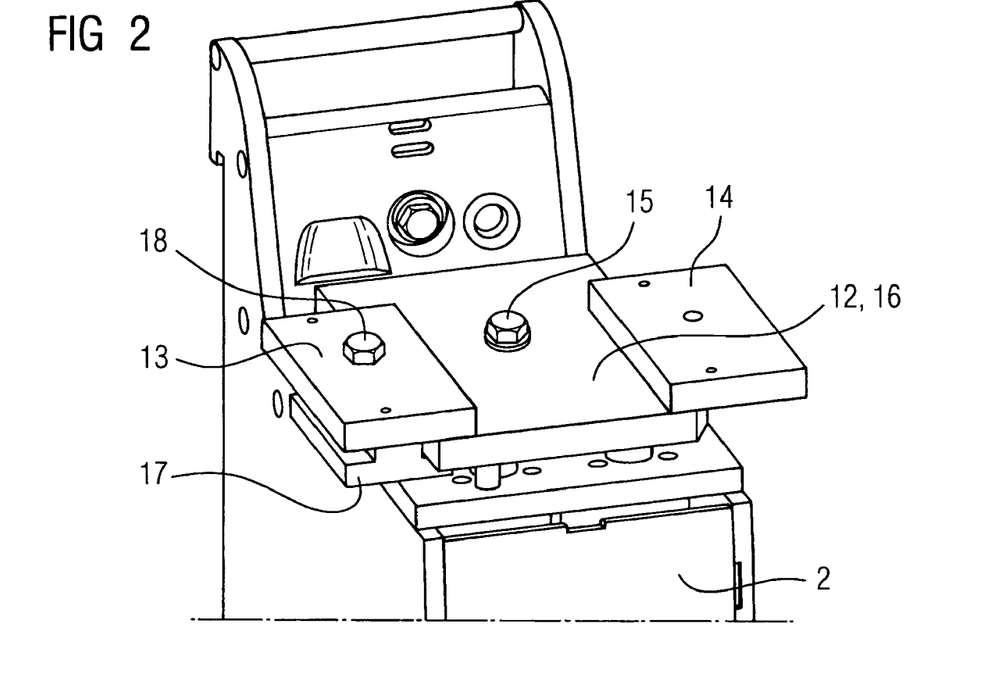
FIG. 2 shows the upper part of one of the modules with a microfluidic part and connecting parts.

FIG. 2 shows the upper part of one of the modules, 2 for example, with the protective covers 10, 11 removed, such that the microfluidic part 12 and the connecting parts 13 and 14 are visible with respect to the adjoining modules 1 and 3. The plate-shaped microfluidic part 12 is supported with its underside in a locally limited area of the plate center on a contact surface of the module 2 and is forced against the latter by means of a releasable fastening element 15 in the form of a screw. The microfluidic part 12 contains a fluid channel system with fluid connections which are arranged on the upper side 16 of the microfluidic part 12 in the edge areas with respect to the microfluidic parts of the adjoining modules 1 and 3. The fluid connections of each two adjoining microfluidic parts, 12 for example, and the corresponding microfluidic part of the module 1, are connected to each other by means of the connecting channels in the connecting part, 13 for example, which is supported bridging the two microfluidic parts on their upper sides in the edge areas. In the corresponding opposite edge areas on the undersides of the two adjoining microfluidic parts is situated a clamping part 17 which is connected in the area between the two microfluidic parts by way of a further releasable fastening element 18, likewise in the form of a screw, to the connecting part 13 and forces this against the upper sides of the two microfluidic parts.

Figure 3:
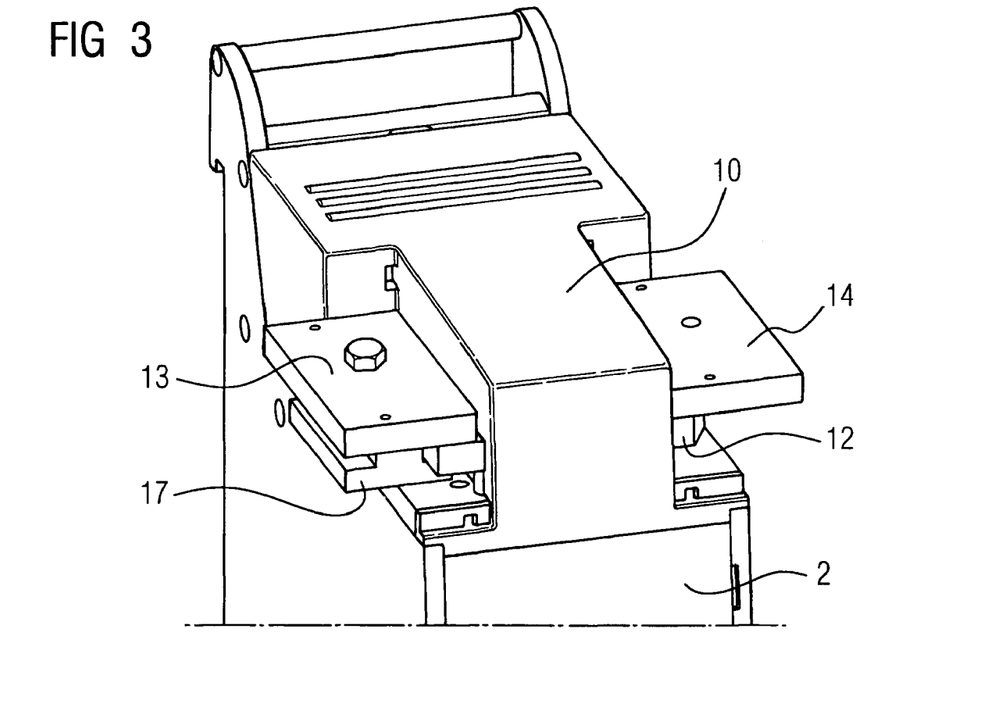
FIG. 3 shows the upper part of one of the modules with a protective cover for the microfluidic part.

FIG. 3 shows the upper part of the module 2 with the protective cover 10 fitted in order to protect the microfluidic part 12. In this situation, the protective cover 12 leaves the edge areas of the microfluidic part 12 uncovered, with the result that the connecting parts 12 and 13 can be mounted or unmounted without removing the protective cover 10.

Figure 4:
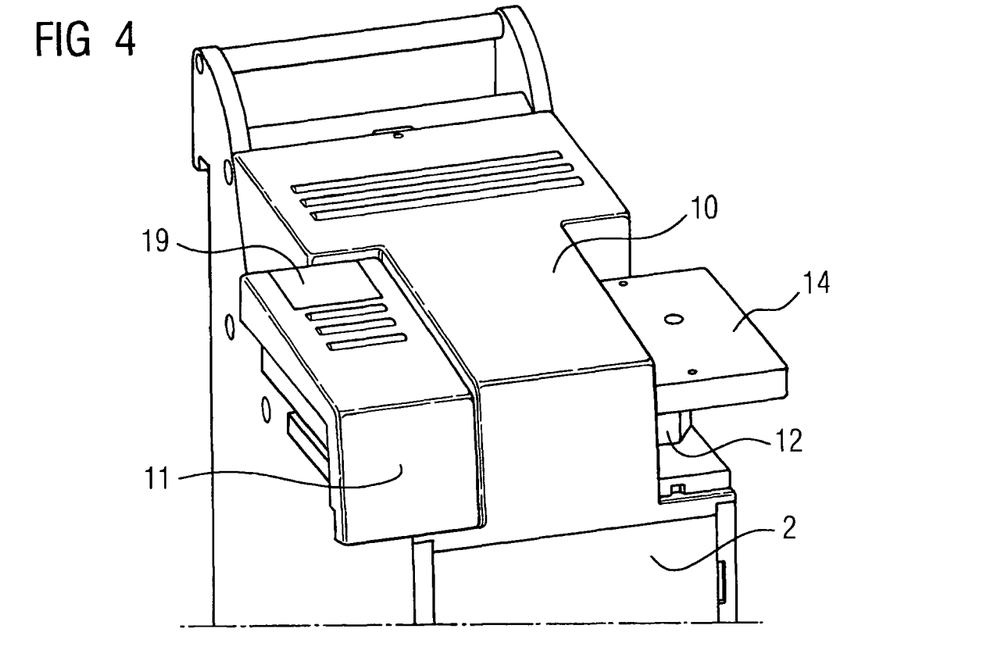
FIG. 4 shows the upper part of one of the modules with a further protective cover for one of the connecting parts.

FIG. 4 shows the upper part of the module 2, whereby both the protective cover 10 for protecting the microfluidic part 12 and also the further protective cover 11 for protecting the connecting part 13 are fitted. The further protective cover 11 has a cover part 19 which can be removed, here by breaking out, in order to allow mounting of a fluidic add-on unit on the connecting part 13.

Figure 5:
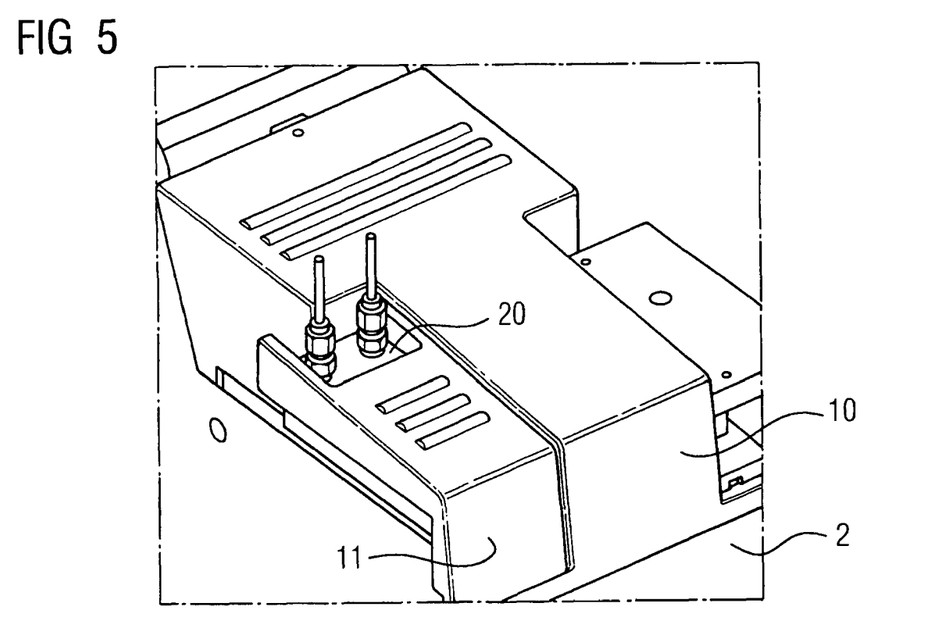
FIG. 5 shows the upper part of one of the modules with a fluidic add-on unit mounted on the connecting part.

FIG. 5 shows the upper part of the module 2 with the fluidic add-on unit 20 mounted on the connecting part 13.

Figure 6:
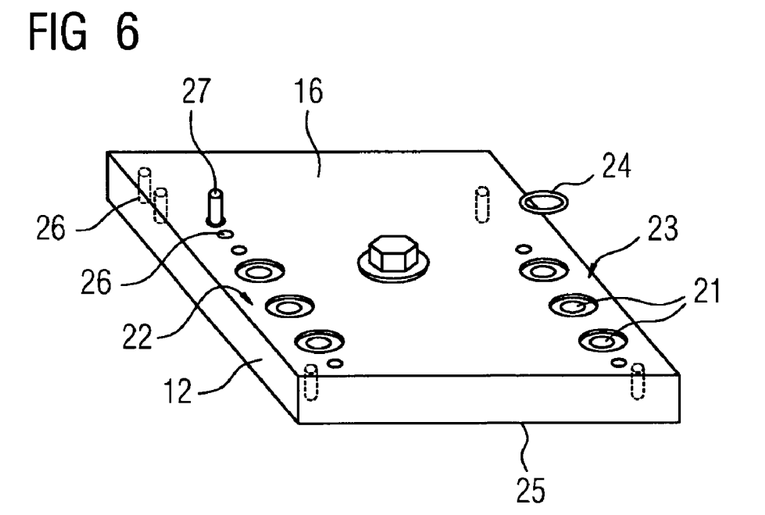
FIG. 6 shows an example of the plate-shaped microfluidic part.

FIG. 6 shows an example of the plate-shaped microfluidic part 12 which can be implemented as an individual plate or in the form of a compound plate made of steel, glass, silicon or some other suitable material. Inside the plate or plates run fluid channels of a fluid channel system, essentially parallel to the two large surface areas of the main plate sides and are connected perpendicularly with respect thereto to the fluid connections 21 in the edge areas 22 and 23 of the upper side 16 of the microfluidic part 12. The fluid connections 21 contain depressions for accommodating elastic sealing means 24 in the form of sealing rings. Positioning means in the form of holes 26 and 26' are provided on the upper side 16 and the underside 25 of the microfluidic part 12 for accommodating guide pins 27 and 27' which serve to align the microfluidic part 12 with respect to the accommodating module or to align the connecting parts with respect to the microfluidic part 12. In this situation, the positioning means 26, 26', 27, 27' are preferably implemented or arranged in accordance with a predefined coding which permits only predefined combinations of microfluidic part and module or connecting part and microfluidic part.

Figure 7:
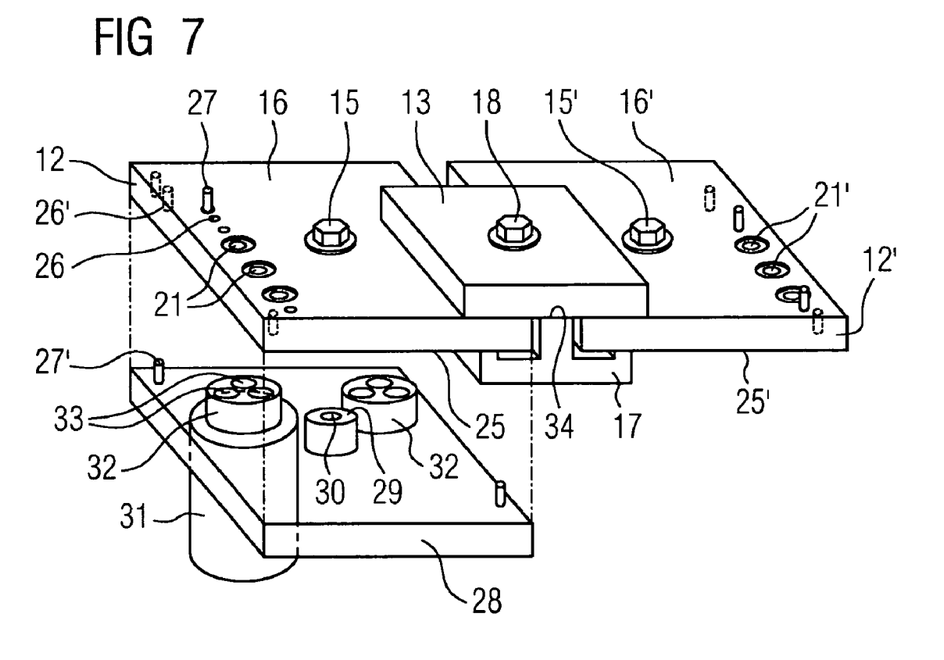
FIG. 7 shows an example of the installation of the microfluidic parts in the modules and the fluidic connection of the microfluidic parts of two adjoining modules by means of the connecting part.

FIG. 7 shows an adapter plate 28 which can be fastened to the module upper side, in the center of which is implemented the contact surface 29 for the microfluidic part 12. The contact surface 29 contains an internal thread into which the screw 15 can be screwed, such that the microfluidic part 12 is forced by means of the screw 15 in the area of the plate center against the contact surface 29. The pin/hole combinations 26', 27' ensure that on the one hand only a microfluidic part 12 which is permitted for the module in question can be mounted on the adapter plate 28 and that on the other hand the microfluidic part 12 is correctly aligned in its position. At least one further microfluidic and/or macrofluidic unit 31 can be mounted on the underside of the adapter plate 28. With regard to the example shown here, the microfluidic part 12 contains on its underside 25 additional fluid connections which serve to connect at least one further microfluidic or macrofluidic unit 31. With regard to these further microfluidic or macrofluidic units 31, these can be pumps, valves, measurement or analytical equipment etc. which on account of their size or for other reasons are not integrated into the microfluidic units, but in other respects are important components of the modules. The further microfluidic or macrofluidic units 31 are accommodated inside the module in a space beneath the adapter plate 28 and connected by way of fluid connection adapters 32 to the additional fluid connections on the underside 25 of the microfluidic part 12. The fluid connection adapters 32 are arranged so as to be easily exchangeable on the adapter plate 28 and have on their upper sides, which project right up to the underside 25 of the microfluidic part 12, the fluid connections 33 of the further microfluidic or macrofluidic units 31 for connection to the microfluidic part 12. Different adapter plates 28 can be provided for different further microfluidic and/or macrofluidic units 31.

FIG. 7 furthermore shows again the fluidic connection of microfluidic parts 12 and 12' of two adjoining modules by means of the connecting part 13 which bridges the two microfluidic parts 12 and 12' and in this situation is supported on the upper sides 16 and 16' in its edge areas containing the fluid connections 21, 21' and adjoining one another. In the opposite edge areas on the undersides 25 and 25' of the two microfluidic parts 12, 12' is supported the clamping part 17 which is connected to the connecting part 13 by way of the further screw 18 in the area between the two microfluidic parts 12, 12' and forces this against the upper sides 16 and 16' of the two microfluidic parts 12 and 12'. In the area between the two microfluidic parts 12 and 12' the clamping part 17 has a further contact surface 34 for the connecting part 13 which is situated at least approximately in the plane of the upper sides 16 and 16' of the microfluidic parts 12 and 12' in such a manner that in the mounted state the connecting part 13 is supported on this further contact surface 34 and cannot bend further or break under the pressure exerted by the screw 18.

Figure 8:
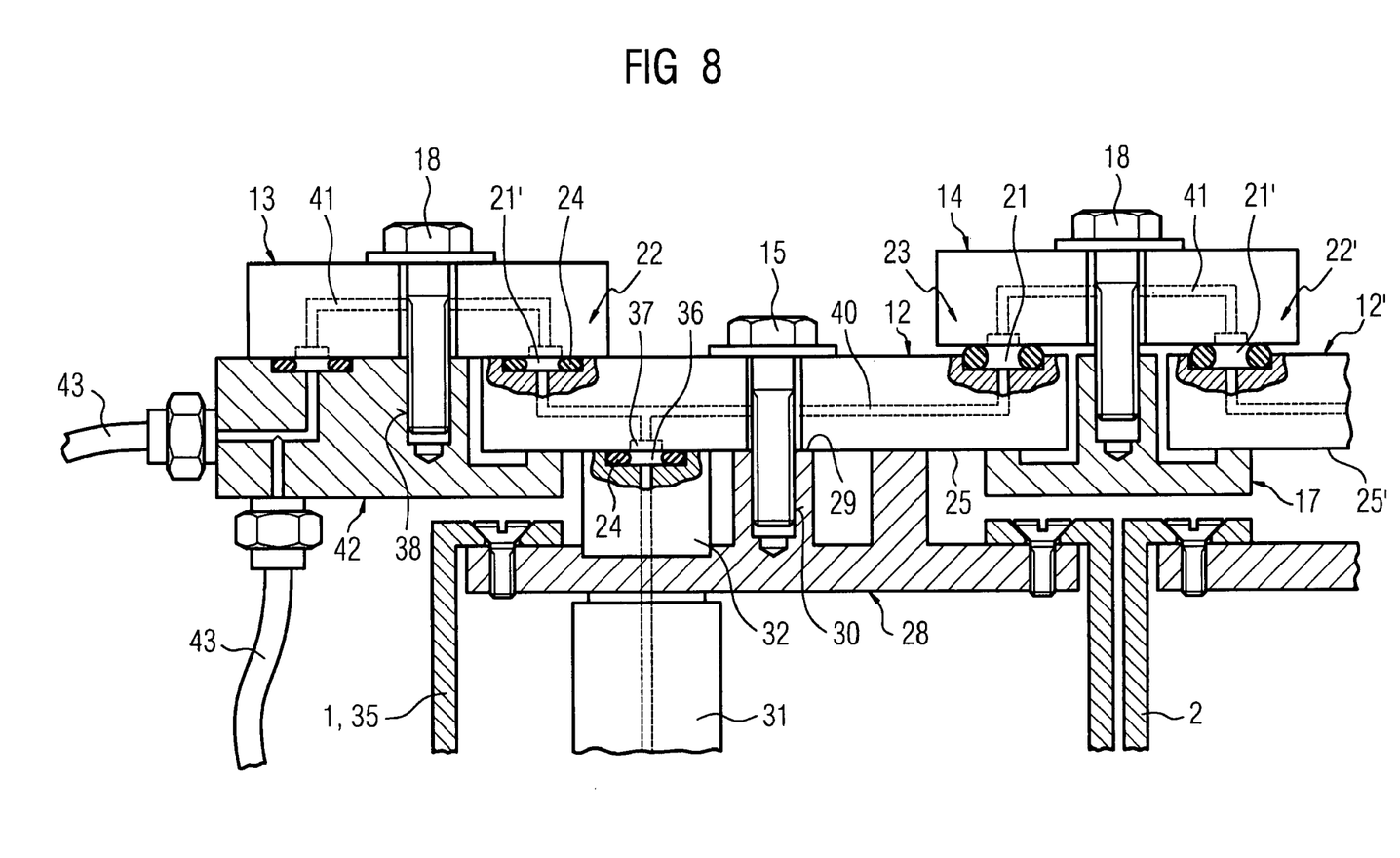
FIG. 8 shows the upper part of an end module in a section along the module row.

FIG. 8 shows the upper part of the end module 1 and part of the module 2 in a section along the module row. In the upper area of the module housing 35 is mounted the adapter plate 28 which on its upper side carries a fluid connection adapter 32 for a further microfluidic or macrofluidic unit 31. The unit 31 is mounted in the housing 35 and connected fluidically from beneath with the fluid connection adapter 32. On the upper side of the fluid connection adapter 32 are formed the further fluid connections 36 of the unit 31 for connection to the microfluidic part 12. The microfluidic part 12 is supported with its underside 25 in the area of the plate center on the contact surface 29 implemented for the purpose on the adapter plate 28, which contains the internal thread 30 for screwing the screw 15 into, such that the microfluidic part 12 is forced by means of the screw 15 in the area of the plate center against the contact surface 29. The adapter plate 20 has furthermore an auxiliary contact surface 39 for the microfluidic part 12, which is arranged symmetrically to the fluid connection adapter 32 with respect to the plate center.

In its interior the microfluidic part 12 contains fluid channels 40 which depending on the function of the module 1 form for example a reactor, a mixer or a delay section for fluids or a plurality of such functional units and run parallel to the upper side and underside 16 and 25 respectively of the planar microfluidic part 12. Those fluid channels 40 which are provided for connection with fluid channels in the microfluidic parts of potentially adjoining modules, here the module 2 for example, open into the fluid connections 21 which are contained on the upper side 16 of the microfluidic part 12 in the edge areas 22 and 23 relative to the potentially adjoining modules. Additional fluid connections 37 on the underside 25 of the microfluidic part 12 serve to connect the further microfluidic or macrofluidic unit 31.

The fluid connections 21, 21' of the adjoining microfluidic parts 12 and 12' are connected with each other by the connecting channels 41 in the connecting part 14 which bridges the two microfluidic parts and in this situation is supported on their upper sides in the edge areas 23, 22'. In the same edge areas 23, 22' the clamping part 17, which is connected in the area between the two microfluidic parts 12 and 12' by way of the further screw 18 to the connecting part 14 and forces the latter against the upper sides of the two microfluidic parts 12 and 12', is supported on the undersides 25, 25' of the two microfluidic parts 12 and 12'. The connecting part 14 is likewise implemented as a plate or compound plate and preferably made from the same material as the microfluidic parts 12, 12', such the formation of electrical local elements is prevented.

The elastic sealing rings 24 arranged in depressions in the area of the fluid connections 21, 21' are forced together by the contact pressure of the connecting part 14 and seal the fluid connections to the outside. In this situation, the sealing rings 24 allow to a certain extent different thickness tolerances or positional tolerances (height displacement) of the respective adjoining microfluidic parts 12, 12' in the vertical direction without compromising the leak-tightness of the system.

Figure 9:
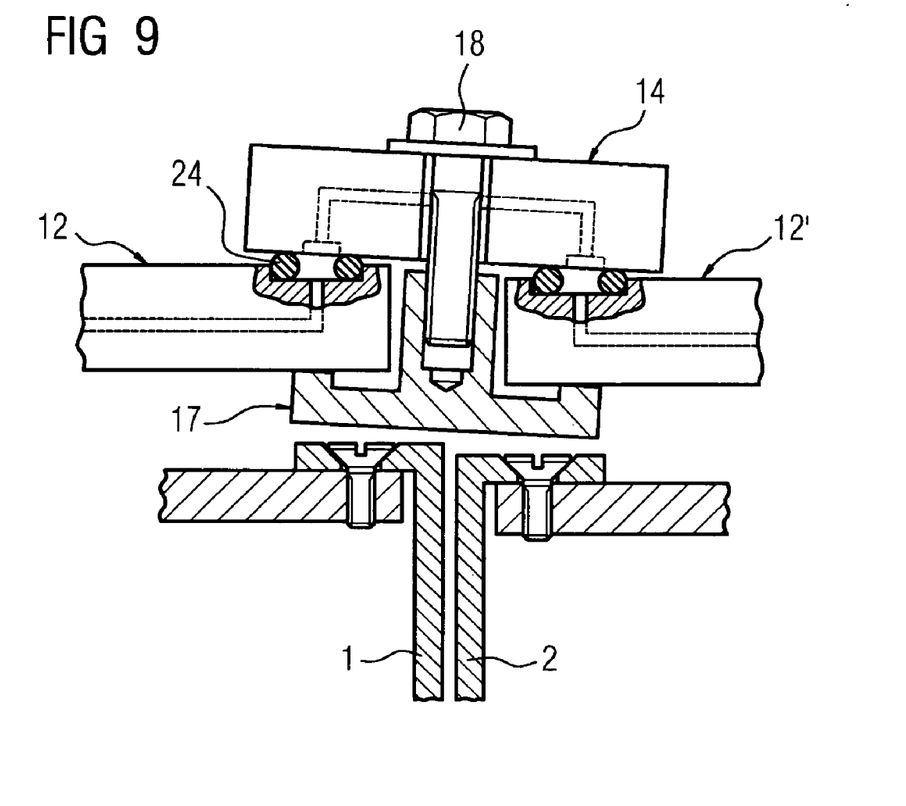
FIG. 9 shows an example of the fluidic connection of two modules in the case of a height displacement between the modules.

FIG. 9 shows an example of the fluidic connection of the modules 1 and 2 in the case of a height displacement between the modules 1 and 2.

As FIG. 8 furthermore shows, a fluid connection part 42 is provided for the end module 1 for the connection of external fluid lines 43 in order to allow fluids to be fed in or removed at end module 1 of the microfluidic system. The fluid connection part 42 is secured by means of the further screw 18 on the underside of the connecting part 13 instead of a clamping part 17 and in this case connects the connecting channels 41 in the connecting part 13 to the external fluid lines 43.

Figure 10:
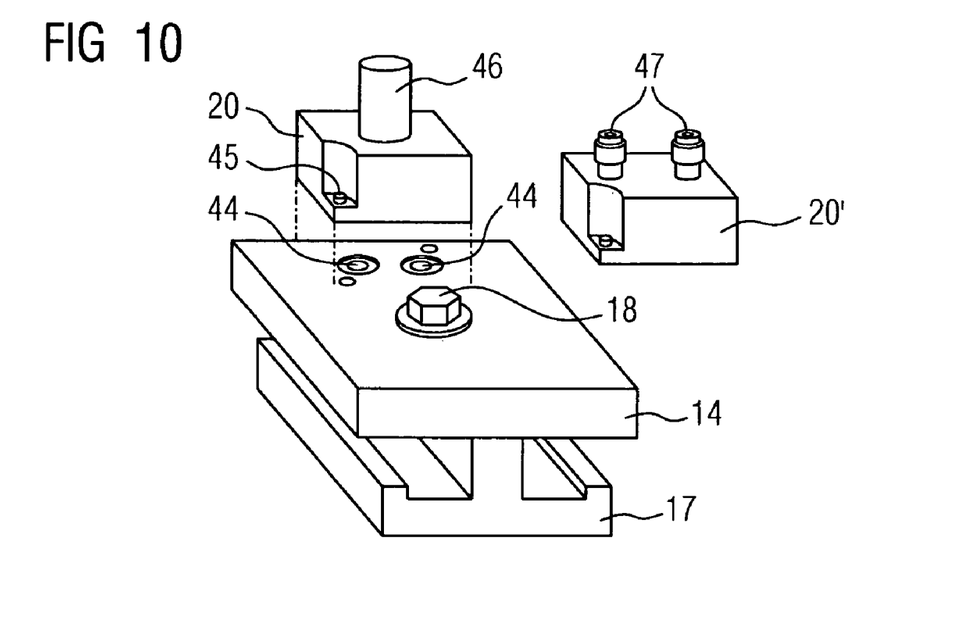
FIG. 10 shows an example of fluidic add-on units which can be mounted on the connecting part.

FIG. 10 shows by way of example two fluidic add-on units 20 and 20' which can be mounted on the connecting part 14. To this end, the connecting part 14 also has further fluid connections 44 and fastening means 45 on its upper side for connection of the fluidic add-on units 20, 20'. The add-on units 20, 20' in question can be non-return valves, manometers, heat exchanger units, optical probes for in-line analysis etc., which can be incorporated by the user into the microfluidic system at different points thereof. It is thus for example also possible to feed in further fluids such as reactants at different points of the microfluidic system or to remove fluids. The fluidic add-on unit 20 has for example an optical probe 46 for liquid analysis, past which a fluid from the microfluidic system is directed in bypass mode. The fluidic add-on unit 20' makes it possible for example to connect an external heat exchanger using the connections 47 in order to heat or to cool fluids conveyed from one module to the next module by the connecting part over and above the capabilities offered by the microfluidic system.

Figure 11:
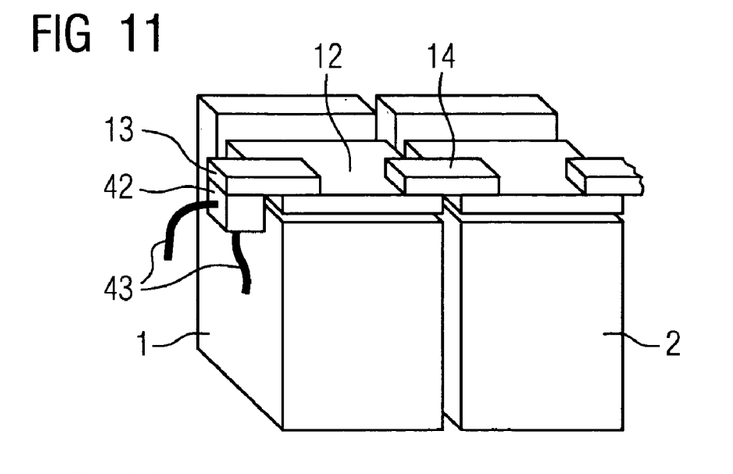
FIGS. 11, 12 and 13 show different examples of end modules
Figure 12:
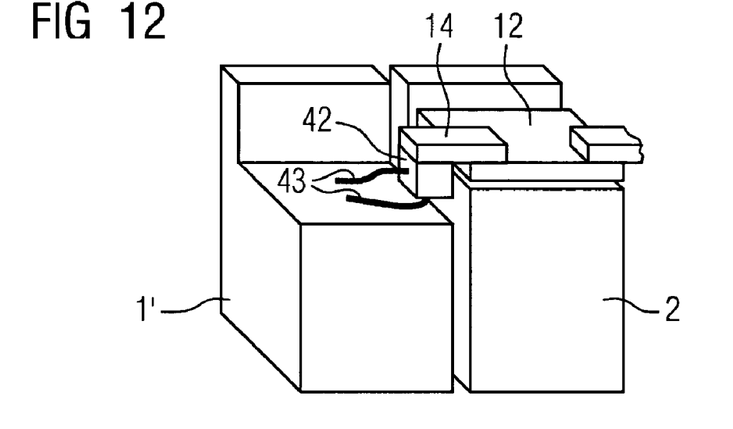
Figure 13:
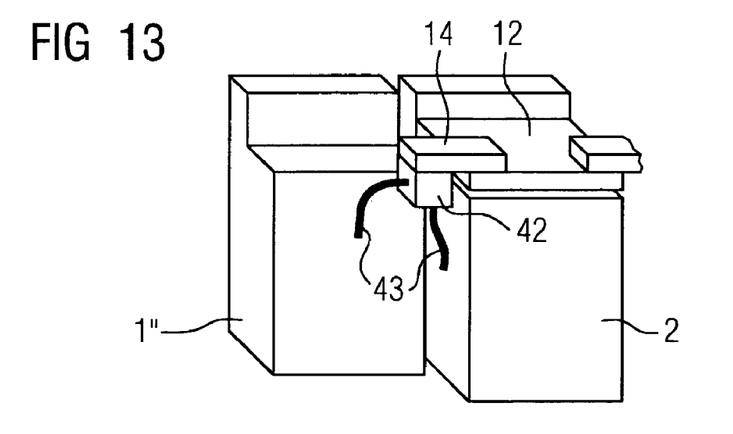

FIGS. 11, 12 and 13 show different examples of end modules 1, 1' and 1" which do not themselves execute any direct microfluidic function and accordingly do not have any corresponding microfluidic part. The modules in question here are for example electronic modules, cryostats, balances or analytical systems, which are to be incorporated into the microfluidic system and linked into the automation of the microfluidic system by way of the electrical line bus common to all modules 1 to 8 (cf. FIG. 1). In order to be able to fit a fluid connection part 42 to the end module for the connection of external fluid lines 43 for the supply of fluids to and the removal of fluids from the microfluidic system, in the case of the embodiment according to FIG. 11, the microfluidic part 12 at the end module 1 simply has the function of conveying the fluids between the connecting parts 13 and 14. In the case of the example according to FIG. 12 the height of the end module 1' and in the case of the example according to FIG. 13 the depth of the end module 1" is reduced to the extent that the fluid connection part 42 with the external fluid lines 43 can be fitted on the module 2 which in the row of modules having a microfluidic function has the function of an end module.

The invention claimed is:

1. A modular microfluidic system, comprising:
a plurality of modules arranged next to each other in a row;
a plurality of plate-shaped microfluidic parts, wherein each module has a plate-shaped microfluidic part, wherein an underside of the plate-shaped microfluidic part is supported by a locally limited area on a contact surface of the module and is forced against the module based upon a releasable fastening element, and wherein the plate-shaped microfluidic parts of respective adjoining modules are located next to each other in a plane;
a fluid channel system with fluid connections for each microfluidic part, wherein the fluid connections are arranged on an upper side of the microfluidic part in edge areas relative to potentially adjoining microfluidic parts;
connecting channels in a connecting part, wherein the fluid connections of two adjoining microfluidic parts are connected to one another by the connecting channels; and
a clamping part supported by the opposite edge areas on the undersides of the two adjoining microfluidic parts, wherein the clamping part
is connected to the connecting part via a further releasable fastening element in the area between adjoining microfluidic parts and
forces the connecting part against the upper sides of the adjoining microfluidic parts.

2. The modular microfluidic system as claimed in claim 1, wherein the connecting part bridges two microfluidic parts based upon a support in edge areas on their upper sides.

3. The modular microfluidic system as claimed in claim 2, wherein the fastening element is a screw screwed in through an opening in the microfluidic part into a screw thread in a contact surface of the module.

4. The modular microfluidic system as claimed in claim 2, wherein the further fastening element is a screw screwed in through an opening in the connecting part into a screw thread in the clamping part.

5. The modular microfluidic system as claimed in claim 2, wherein in the area between the adjoining microfluidic parts the clamping part has a further contact surface for the connecting part, which is located at least approximately in the plane of the upper sides of the microfluidic parts.

6. The modular microfluidic system as claimed in claim 2, wherein each microfluidic part and each module has positioning devices to align the microfluidic part with respect to the module.

7. The modular microfluidic system as claimed in claim 2, wherein the connecting part and the adjoining microfluidic parts to be bridged by the connecting part have further positioning devices to align the connecting part with respect to the two microfluidic parts.

8. The modular microfluidic system as claimed in claim 6, wherein the positioning device has a coding allowing only predefined combinations of microfluidic part and module or connecting part and microfluidic part.

9. The modular microfluidic system as claimed in claim 7, wherein the further positioning device has a coding allowing only predefined combinations of microfluidic part and module or connecting part and microfluidic part.

10. The modular microfluidic system as claimed in claim 1, wherein in at least one of the modules at least one further microfluidic or macrofluidic unit is mounted beneath the microfluidic part such that further fluid connections of the at least one further microfluidic or macrofluidic unit outside of the locally limited area press against the underside of the microfluidic part and are thereby connected with additional fluid connections of the microfluidic part.

11. The modular microfluidic system as claimed in claim 10, wherein within an one-sided arrangement of the further fluid connections of the at least one further microfluidic and/or macrofluidic unit with respect to the contact surface of the respective module the module has an auxiliary contact surface on an opposite side at approximately the same distance from the contact surface.

12. The modular microfluidic system as claimed in claim 10, wherein the contact surface for the microfluidic part is implemented on the upper side of an adapter plate, wherein the adapter plate is secured on a housing of the module and exchangeable, wherein on an underside of the adapter plate the at least one further microfluidic or macrofluidic unit is mounted.

13. The modular microfluidic system as claimed in claim 12, wherein the adapter plate contains openings through which the further fluid connections of the at least one further microfluidic and/or macrofluidic unit project as far as the underside of the microfluidic part.

14. The modular microfluidic system as claimed in claim 12, wherein the adapter plate comprises a fluid connection adapter with further fluid connections, wherein the further fluid connections are located on an upper side of the adapter and, project to the underside of the microfluidic part, and wherein on an underside of the adapter the at least one further microfluidic and/or macrofluidic unit are fluidically connectable.

15. The modular microfluidic system as claimed in claim 1, wherein at least one of the connecting parts has on its upper side yet further fluid connections and fastening devices for the connection of a fluidic add-on unit.

16. The modular microfluidic system as claimed in claim 1, wherein for end modules in the row of the modules a fluid connection part for the connection of external fluid lines is provided which can be secured on the underside of the connecting part based upon the further releasable fastening element and thereby connects the connecting channels in the connecting part to the external fluid lines.

17. The modular microfluidic system as claimed in claim 1, wherein the plate-shaped microfluidic parts are covered from above by a protective cover leaving the edge areas uncovered and secured in a releasable manner to the respective module.

18. The modular microfluidic system as claimed in claim 17, wherein the connecting parts are covered in each case by a further protective cover inserted between the protective covers of adjoining modules.

19. The modular microfluidic system as claimed in claim 18, wherein the further protective cover has a removable cover part above an area provided for the connection of a fluidic add-on unit on the connecting part.

* * * * *